(12) United States Patent
Brown et al.

(10) Patent No.: US 6,392,846 B1
(45) Date of Patent: *May 21, 2002

(54) COIL WIRE LUBRICANT FOR USE IN MAGNETIC DISK DRIVES

(75) Inventors: Charles Allen Brown, Los Gatos; Heidi Lee Merkins, Morgan Hill; Robert Carl Reinhart, San Jose; Ronald Lee Weaver, San Jose; Herman Russell Wendt, San Jose, all of CA (US); Susan G. Scanlon, Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/762,753

(22) Filed: Dec. 10, 1996

(Under 37 CFR 1.47)

(51) Int. Cl.[7] .................................................. G11B 5/55
(52) U.S. Cl. ........................................................ 360/265
(58) Field of Search ................................. 360/106, 105, 360/97.01, 98.01

(56) References Cited

U.S. PATENT DOCUMENTS

| | | | |
|---|---|---|---|
| 1,327,933 A | 1/1920 | Young | |
| 2,008,277 A | 7/1935 | Gordon et al. | |
| 3,413,148 A | 11/1968 | Sattler et al. | |
| 4,270,373 A | 6/1981 | Hirto et al. | 72/41 |
| 4,321,426 A | * 3/1982 | Schaeffer et al. | 174/34 |
| 4,352,134 A | 9/1982 | Burns et al. | 360/123 |
| 4,503,605 A | * 3/1985 | Buckley | 29/605 |
| 4,605,917 A | 8/1986 | Ide et al. | 335/128 |
| 4,716,079 A | 12/1987 | Sano et al. | 428/383 |
| 5,207,935 A | * 5/1993 | Waynick | 252/18 |
| 5,254,408 A | 10/1993 | Takeuchi et al. | 428/383 |
| 5,726,835 A | * 3/1998 | Scanlon et al. | 360/106 |

FOREIGN PATENT DOCUMENTS

| | | |
|---|---|---|
| DE | 0208926 | 4/1984 |
| JP | 56135600 | 3/1980 |
| JP | 57108195 | 12/1980 |

* cited by examiner

Primary Examiner—Robert S. Tupper
(74) Attorney, Agent, or Firm—Robert B. Martin; Noreen A. Krall; Randall J. Bluestone

(57) ABSTRACT

A coil assembly for disk drive components is presented which includes a coil winding free of lubricants that cause stiction problems during the operation of the disk drive assembly. An actuator coil and spindle motor winding are disclosed which include a conductor, an insulating layer over the conductor, a bond coat overlying the insulating layer, and a lubricant coating on the insulating layer. The lubricant coating is a hydrocarbon based oil having a molecular weight within ranges that will not volatilize and condense on the surface of the disks in the drive.

11 Claims, 10 Drawing Sheets

COIL WIRE LUBRICANT FOR USE IN MAGNETIC DISK DRIVES

BACKGROUND OF THE INVENTION

1. Field of the Invention

This invention relates in general to disk drives, and in particular to use of specific molecular weight oils for lubricating the coil wire during the winding of coils which are used in disk drive components in order subsequently to reduce the occurrence of stiction during operation of the disk drive and improve drive performance.

2. Description of Related Art

Moving magnetic storage devices, especially magnetic disk drives, are the memory device of choice. This is due to their expanded non-volatile memory storage capability combined with a relatively low cost.

Magnetic disk drives are information storage devices which utilize at least one rotatable magnetic media disk having concentric data tracks defined for storing data, a magnetic recording head or transducer for reading data from and/or writing data to the various data tracks, a slider for supporting the transducer adjacent the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air bearing, generated by the rotating disk.

Alternatively, the transducer may operate in contact with the surface of the disk. Thus the suspension provides desired slider loading and dimensional stability between the slider and an actuator arm which couples the transducer/slider/suspension assembly to the actuator. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks. The actuator may include a single arm extending from a pivot point, or alternatively a plurality of arms arranged in a comb-like fashion extending from a pivot point. A rotary voice coil motor (vcm) is attached to the rear portion of the actuator arm or arms to power movement of the actuator over the disks.

The vcm located at the rear portion of the actuator arm is comprised of a top plate spaced above a bottom plate with a magnet or pair of magnets therebetween. The vcm further includes an electrically conductive coil disposed within the rearward extension of the actuator arm and between the top and bottom plates, while overlying the magnet in a plane parallel to the magnet. In operation, current passes through the coil and interacts with the magnetic field of the magnet so as to rotate the actuator arm around its pivot and thus position the transducer as desired.

The magnetic media disk or disks in the disk drive are mounted to a spindle. The spindle is attached to a spindle motor which rotates the spindle and the disks to provide read/write access to the various portions on the concentric tracks on the disks. The spindle motor contains conductive coils in the spindle motor windings.

These electrically conductive coils are typically wound from an insulated wire. The wire may, in addition, have a bond coat to help facilitate the shaping or forming of the coil. In either case, a film of oil coating is often applied to keep the wire from sticking to itself prior to winding of the wire into a coil. When the wire is wound into the coil, oil may be trapped between and/or in the layers of winding as well as being found on the outer surfaces of the coil. As power is supplied to the coil during operation, the coil becomes hot and the oil coating in and on the coil volatilizes to generate a vapor inside the drive. The vapor migrates from the actuator or spindle motor assembly and condenses upon the surface of the disk where the temperature is significantly cooler than in the actuator or spindle motor assembly. This presents problems for normal operation of the disk drive because this vapor phase transport provides means for the lubricant to exit the coil and contaminate the disk drive.

To accommodate the current capacity requirements of disk drives as well as meeting the size constraints of laptop or notebook markets, disks are being stacked very closely together with the expectation they can be written to and read from within these very small spacings. Accordingly, extremely smooth surfaces exist on both the disk surface and the magnetic recording face of the slider attached to the load arm of the actuator. These extremely smooth surfaces are necessary to support the low fly height associated with high density recording. However, with the condensation of the lubricant coating from the coil onto the disk surface, the surface becomes chemically contaminated, causing the problem of stiction in the drive. Stiction occurs as two very smooth surfaces stick to each other and effectively prevent the removal of one from the other. The stiction forces may be sufficient to prevent the rotation of the disk; but if the disk can be rotated, damage almost certainly will occur to the surface of the disk or slider due to the fact that the slider is in contact with and stuck to the disk surface as the disk moves relative to the slider.

One approach considered in addressing the problem of stiction has been to use a higher resistance coil, or to adjust coil performance by continually checking the temperature or a temperature estimation and not driving the coil at temperatures which would cause outgassing of the lubricant. These approaches however are problematic in that they negatively effect the performance of the drive. For example, seek rates in the actuator would be affected by lowering the performance of the coil, or desired higher RPMs of the spindle motor might not be obtainable by limiting the coil temperature.

It therefore can be seen that there is a need for providing a coil wire for use in disk drive components such as the actuator assembly or spindle motor which is free of lubricants that will outgas during operation and contaminate the surface of the disks in the drive.

Another consideration in coil selection is the manufacturability of the coil. One common method of coil winding involves unspooling of the wire off one end of a non-rotating flanged spool, through a series of tensioner pulleys onto a spinning mandrel. The wire stops and starts moving rapidly, and is heated just before arriving at the mandrel using a hot air jet. The temperature at this point could exceed 450 degrees Celsius. The dimensional requirements and number of turns and layers of the coil, and precise stacking of the wire on itself place high demands on the wire quality, frictional characteristics and bond coat performance. It can therefore be further seen that there is a need to provide a conductive coil for a hard disk drive wherein the oils used to lubricate the wires that create the coil maintain low friction in the spooling, despooling and coiling winding operations. It can also be seen that there is a need to eliminate the problems of stiction in operating a disk drive assembly.

SUMMARY OF THE INVENTION

To overcome the limitations of the background art described above, and to overcome other limitations that will become apparent upon reading and understanding the present specification, the present invention discloses an improved coil wire and method of manufacturing coil assemblies which are adapted for use in hard disk drives. It is one aspect of the invention to provide an improved coil for use in an actuator assembly that is free of the molecular weight hydrocarbon range based lubricants which contribute to stiction problems during disk drive operation. It is a further object of the invention to provide conductive wire coil assemblies for use in various disk drive components, such as spindle motor windings, having lubricants that will not contribute to stiction problems in operation of the disk drive. It is a further object of the invention to provide an improved coil wire that will maintain low friction in the spooling, despooling and coil winding operations.

In order to accomplish the objects of the present invention, in a preferred embodiment a coil assembly is provided wherein a high molecular weight hydrocarbon based lubricant is used to coat the coil wire in the assembly. The coil wire is comprised of an electrical conductor enclosed by an insulating layer. An adhesive bond coat may overlay the insulating layer to aid in the forming and shaping of the coil. A lubricant layer overlies either the insulator or alternatively the bond coat to prevent the coil wire from sticking to itself during the spooling and despooling operations prior to coil winding. The preferred embodiment is a lubricant which experiences less than or equal to 10% weight loss at 2 to 2½ times the operating temperature of the coil in degrees Celsius. In one embodiment, the lubricant is preferably a high molecular weight hydrocarbon based lubricant having molecular weight of greater than or equal to 700.

In operation of the disk drive, as power is supplied to the coil, the coil becomes hot. However, due to the high molecular weight of the lubricant selected, the oil does not volatilize but rather remains intact as a coating on the coil.

In an alternative embodiment, a very low molecular weight hydrocarbon based lubricant is used to coat the coil wire in the coil assembly. The coil wire is comprised of an electrical conductor enclosed by an insulating layer. An adhesive bond coat may overlay the insulating layer to aid in the forming and shaping of the coil. A lubricant layer overlies the bond coat to prevent the coil wire from sticking to itself during the spooling and despooling operations prior to coil winding. The lubricant is alternatively a low molecular weight hydrocarbon based lubricant having a molecular weight of 226. In operation of the disk drive, current passes through the coil and the coil becomes hot. In this alternative embodiment, the oil comprising the lubricant layer of the coil has either been completely volatilized in the manufacturing process or any residual material will be completely volatilized and thus there is no subsequent condensation on the surface of the disk, and therefore, no contamination.

Although the preferred embodiment of the present invention is shown and described in connection with the coil found in the actuator assembly, it will be appreciated by those skilled in the art that the wire coils and methods of manufacturing the same described herein are also applicable to other coil windings found within a disk drive, such as within the spindle motors, solenoids, etc. Additionally, the results obtained have been achieved by correction of the stiction problems of a specific head/disk interface. Those skilled in the art would appreciate that adjusting the molecular weights of the lubricant for different interfaces or for different operational results could be done without departing from the spirit or scope of the invention.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
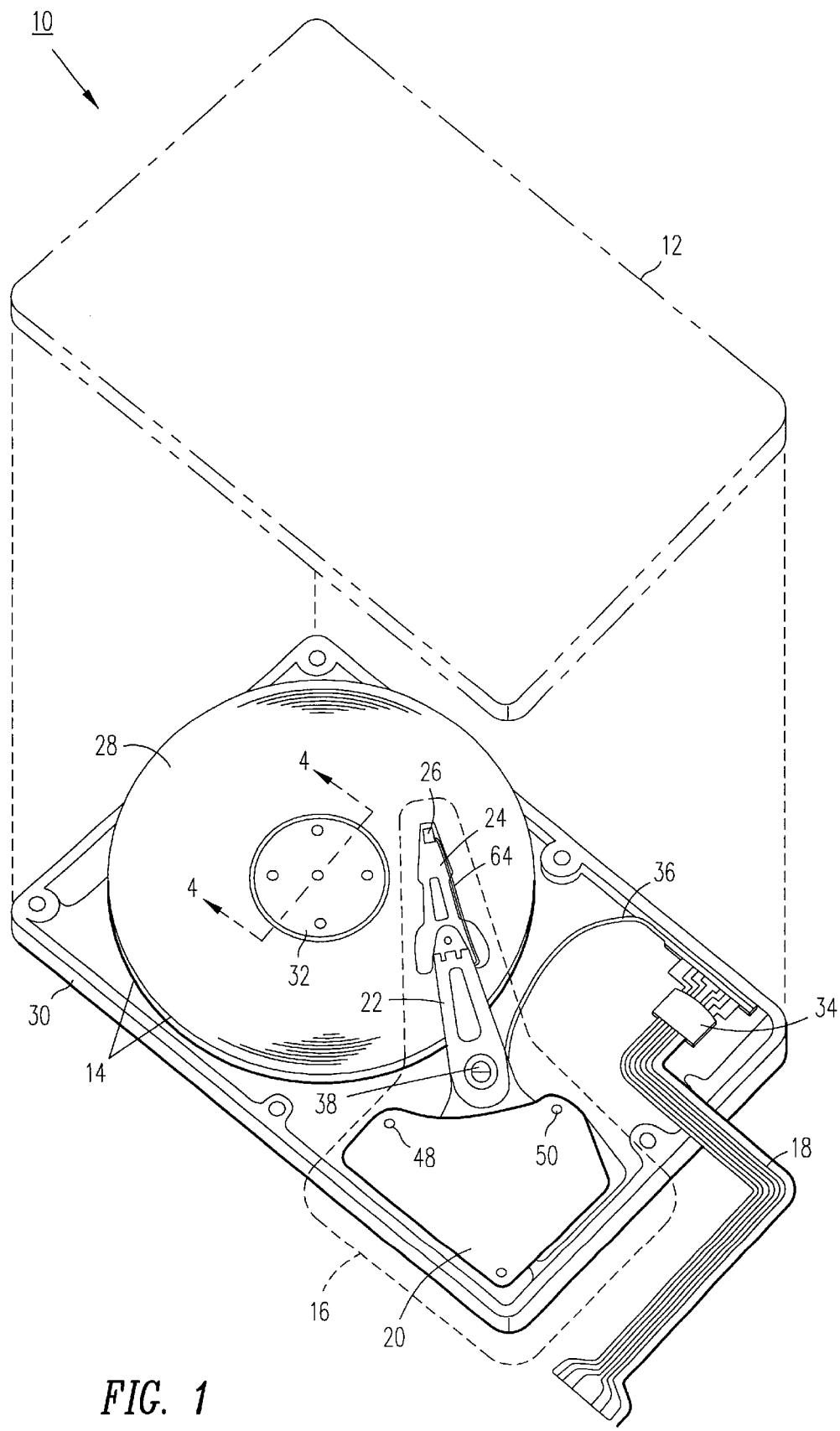
FIG. 1 illustrates a perspective view of a disk drive in accordance with the present invention, showing the inside of the disk drive.

FIG. 1 shows a disk drive system designated by the general reference number 10. The lid 12 of the disk drive is shown exploded and in phantom. In operation, the lid would be disposed atop of housing 30.

The disk drive comprises one or more magnetic disks 14. The disks 14 may be conventional particulate or thin film recording disks, which are capable of storing digital data in concentric tracks. In a preferred embodiment, both sides of the disks 14 are available for storage, and it will be recognized by one of ordinary skill in the art that the disk drive 10 may include any number of such disks 14.

The disks 14 are mounted to a spindle 32. The spindle 32 is attached to a spindle motor (shown and described in connection with FIG. 4) which rotates the spindle 32 and the disks 14 to provide read/write access to the various portions of the concentric tracks on the disks 14.

An actuator assembly 16, in accordance with the present invention is indicated by the dashed lines in FIG. 1. The actuator assembly 16 includes a positioner arm 22, and a suspension assembly 24. The suspension assembly 24 includes a read/write head 26 at its distal end. Although only one read write head 26 of the suspension assembly is shown, it will be recognized that the disk drive 10 has one read/write head 26 for each side of each disk 14 included in the drive 10. The positioner arm 22 further comprises a pivot 38 around which the positioner arm 22 pivots.

The disk drive 10 further includes read/write chip 34. As is well known in the art, the read/write chip 34 cooperate with the read/write heads 26 to read from or write to the disks 14. A flexible printed circuit member 36 carries digital signals between the chip 34 and the actuator assembly 16. One or more electrical conductors 64 are routed along the pivot arm 22 and suspension 24 to carry electrical signals to and from the read/write head 26. A separate flexible printed circuit member 24 interfaces with the chip 34 and associated drive electronics (not shown).

A vcm top plate 20 is part of the actuator assembly 16. One of the functions of the actuator assembly 16 is to move the positioner arm 22 around pivot 38. The specific operation will be detailed below.

Figure 2:
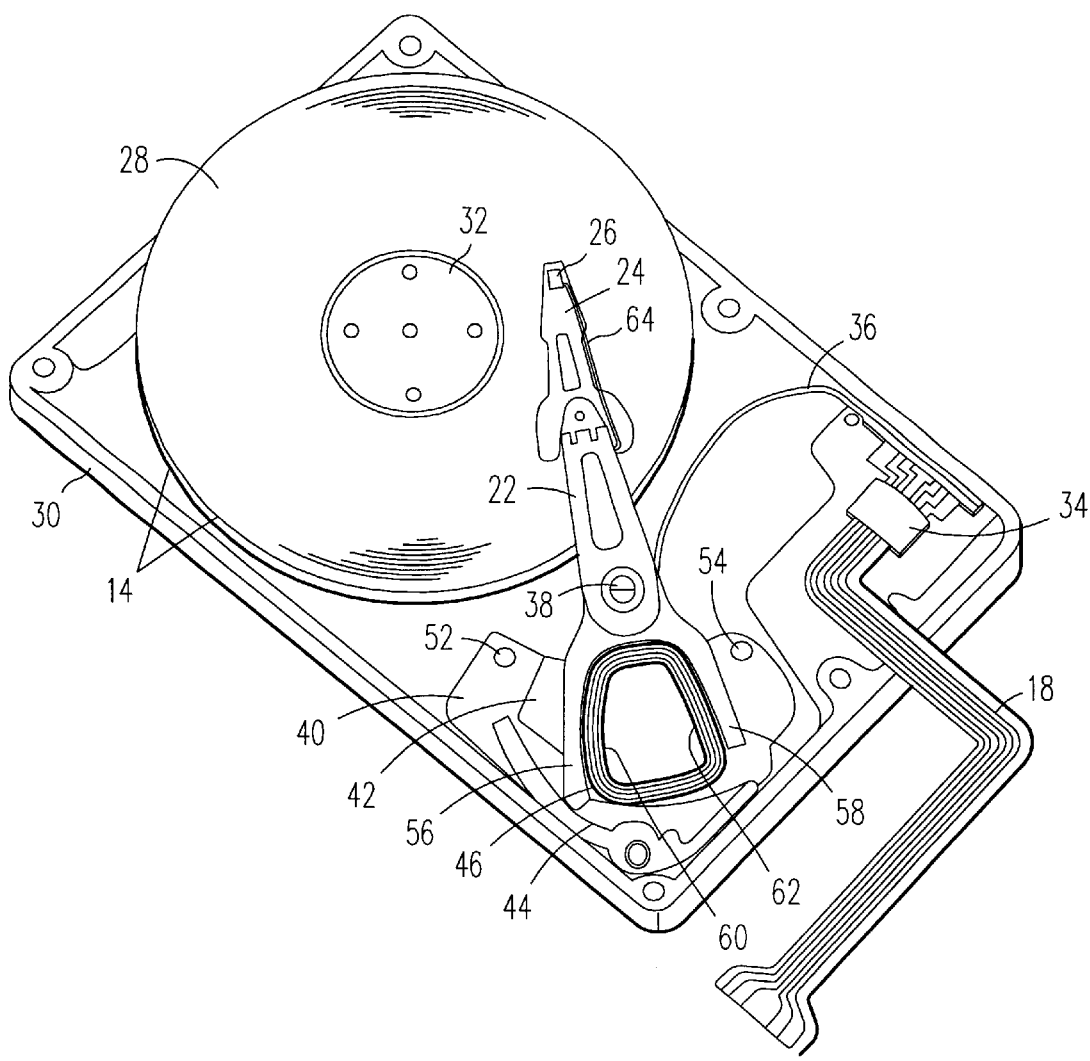
FIG. 2 illustrates a perspective view of a disk drive in accordance with the present invention, showing the inside of the disk drive with the top plate of the voice coil motor removed.

Referring now to FIG. 2, a perspective view of the disk drive is shown with vcm top plate 20 removed to reveal the details of the remainder of the actuator assembly 16. The actuator assembly 16 further comprises a vcm bottom plate 40 and a magnet 42. It is understood that magnet 42 may be a single magnet or a pair of magnets. In operation, the vcm top plate 20 is spaced above the vcm bottom plate 40 and magnet 42 with spacers 48 and 50 (see FIG. 1). In the preferred embodiment, the spacers 48 and 50 are magnetic stand-offs. The vcm top plate 20 is positioned above the vcm bottom plate 40 and the magnet 42 by mating the standoffs 48 and 50 with openings 52 and 54 in the vcm bottom plate 40 respectively. The actuator assembly 16 further includes a conductive coil 46. The conductive coil 46 has portions 60 and 62 which overlie the magnet 42 in a plane parallel to the magnet 42.

The vcm bottom plate 40, the magnet 42 and the vcm top plate 20, in combination with the conductive coil 46, substantially make up a voice coil motor (vcm) which acts to position the actuator assembly 16, as is well known in the art. Specifically, current passing through the coil portions 60 and 62 interact with the magnetic field of the magnet 42, to rotate the positioner arm 22 and suspension assembly 24 around the pivot 38, thus positioning the read/write head 26 as desired. Also shown in FIG. 2 is a latching mechanism 44, known in the art, which serves to secure the position of the actuator assembly 16 when the drive 10 is not in operation.

Figure 3A:
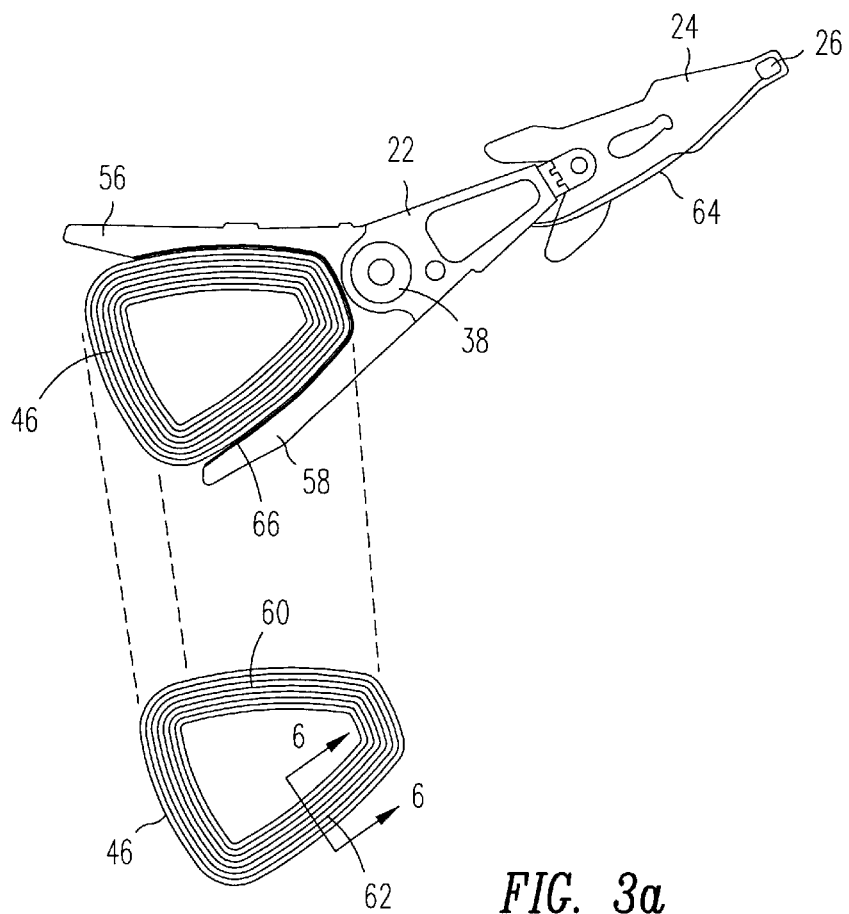
FIG. 3a illustrates an isometric view of a single actuator arm suspension assembly in accordance with the present invention.
Figure 3B:
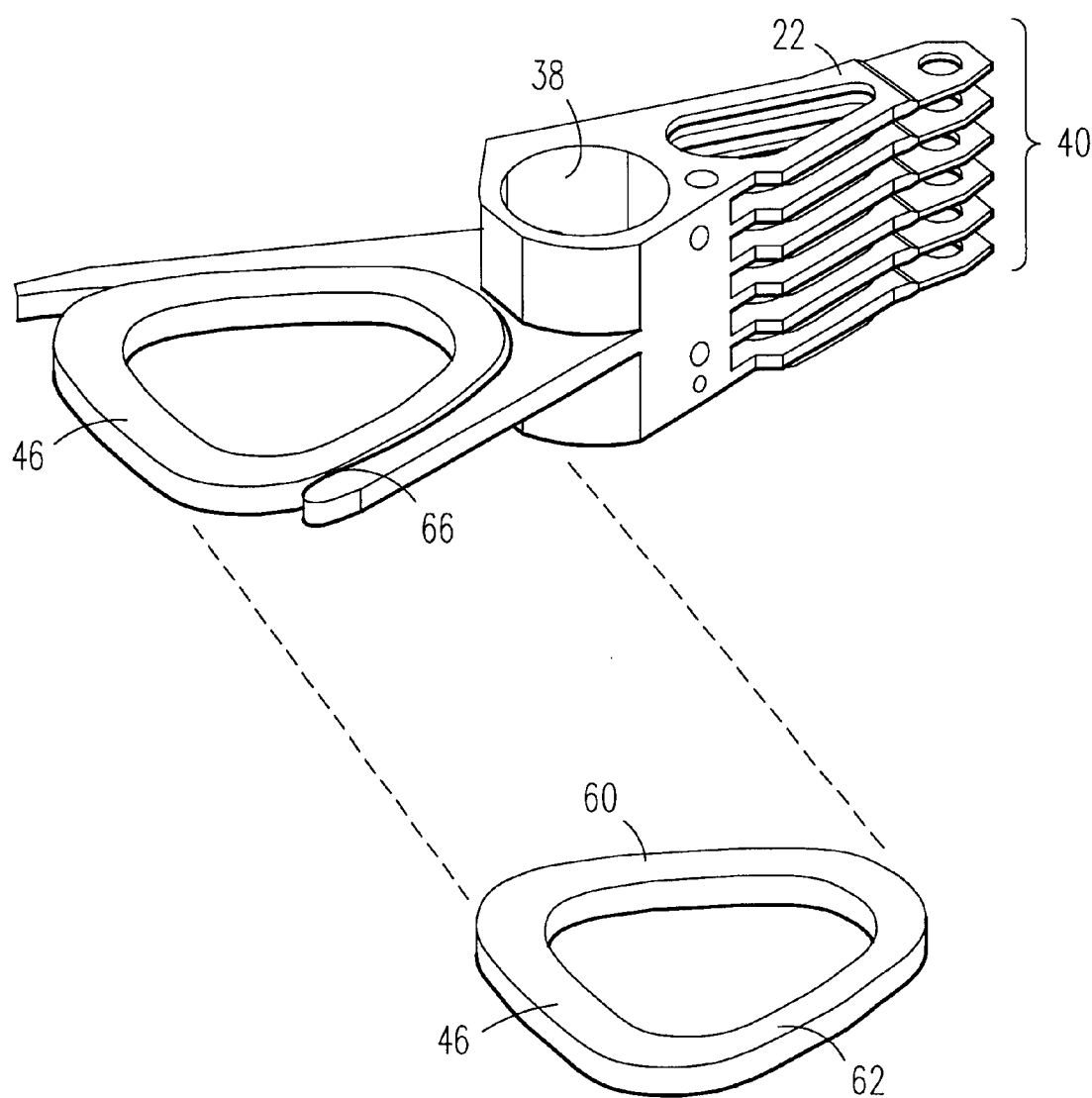
FIG. 3b illustrates an isometric view of a comb actuator arm assembly.

FIGS. 3a and 3b are enlarged, exploded views of the positioner arm 22 and suspension assembly 24, showing the conductive coil 46 disposed between a pair rearward extensions 56 and 58 of the positioner arm 22. FIG. 3a shows a single positioner arm 22 extending from pivot 38, while FIG. 3b shows a comb 40 of positioner arms 22 extending from pivot 38. The rearward extensions 56 and 58 allow for balancing the positioning arm 22 around pivot 38, as is known and desired in disk drive actuator assemblies. Conductive coil 46 may be secured between the rearward extensions 56 and 58 of the positioning arm 22 by an adhesive or epoxy bond 66 between the conductive coil 46 and inner sides of the rearward extensions 56 and 58. Alternatively, the conductive coil 46 may be positioned between rearward extension 56 and 58 by plastic overmolding as is known in the art.

Figure 4:
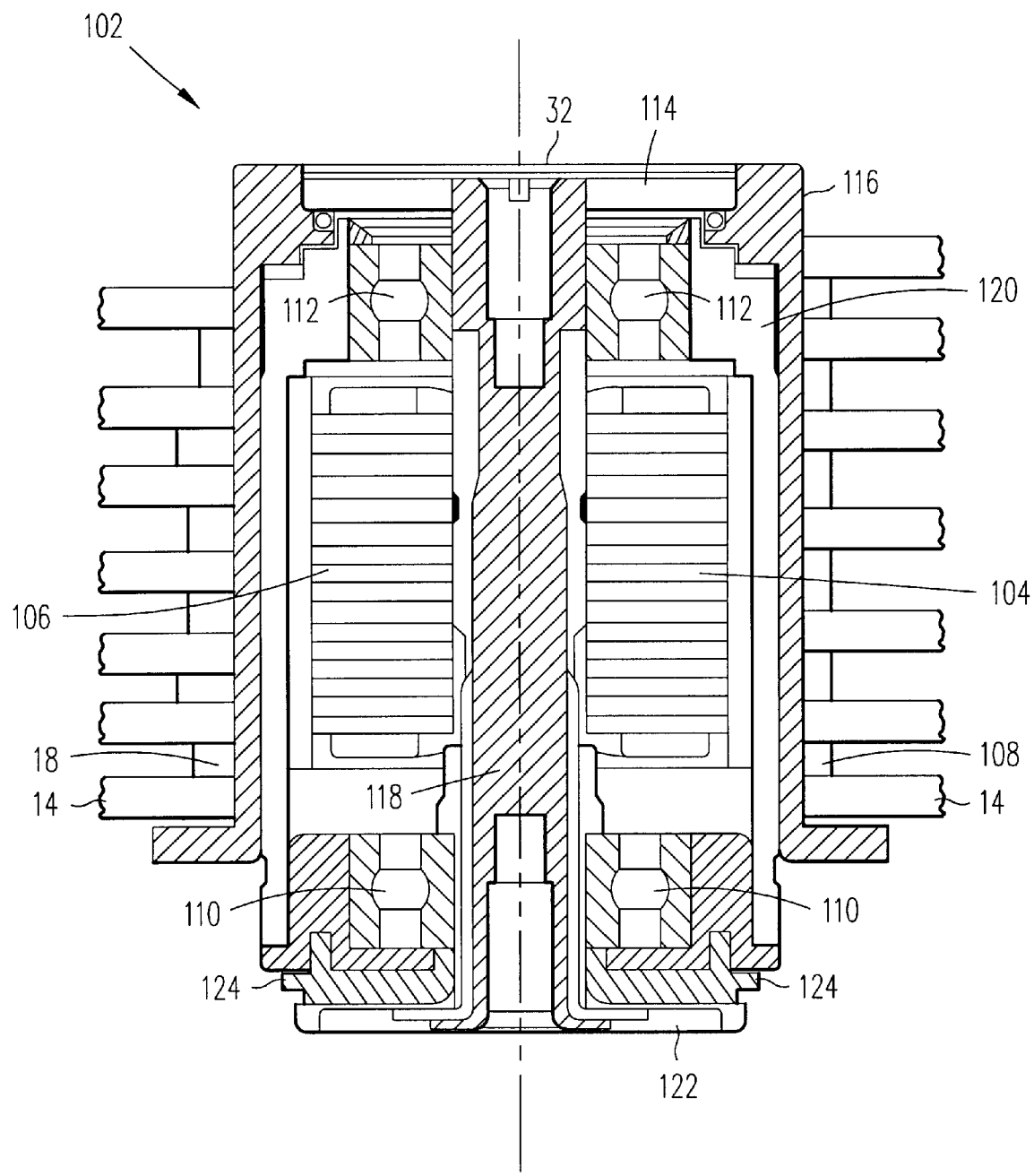
FIG. 4 is a cross-sectional view of a spindle motor having coil windings as taught by the present invention.

FIG. 4 is a cross-sectional view of a spindle motor assembly 102 taken along lines 4—4 of FIG. 1, incorporating coil wires 78 disclosed by the present invention. Specifically, FIG. 4 shows spindle 32 about which is mounted disks 14 separated by spacer rings 108. Spindle includes spindle hub 116 bearing sleeve 120, mounted by means of bearings 110 and 116 to stator shaft 32. Stator shaft 32 is rigidly mounted to base 122 and provides the axis about which the spindle assembly rotates. Stator shaft 32 supports a stack of stator plates 104 and 106, having circular cutouts about their periphery. Conductive wires 78 are wound through the cutouts forming stator coils. Magnets 124 mounted to base 122 control switching of the current supplied to the stator coils as is known in the electric motor arts.

Figure 5A:
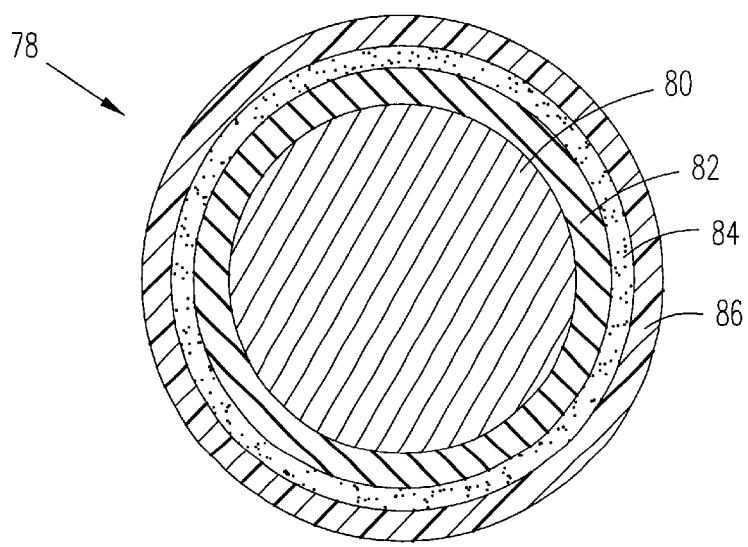
FIG. 5a is a cross-sectional view of one embodiment of the coil wire in accordance with the present invention.
Figure 5B:
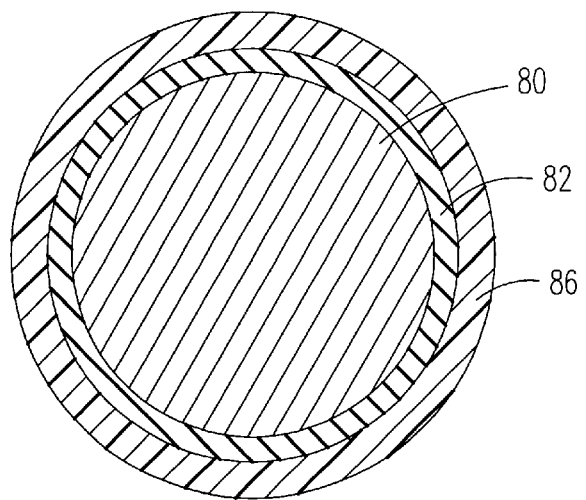
FIG. 5b is a cross-sectional view of an alternative embodiment of the coil wire in accordance with the present invention.

With reference now to FIGS. 5a and 5b, the coil wire 78 in accordance with the present invention is shown and described. FIG. 5a is a cross sectional view of a preferred embodiment of the actuator coil wire 78 according to the present invention. In a preferred embodiment, coil wire 78 is comprised of a conductive core 80. Conductive core 80 is a highly conductive metal such as copper or aluminum. The conductive core 80 is selected to meet the specific operating parameters and acceptable resistance for a particular application.

Overlying the conductive core 80 is an insulation layer 82. Insulation layer 82 is simply a temperature resistant covering such as a polyurethane or a polyesterimide resin which is provided to keep the conductive core 80 from shorting.

Overlying the insulation layer 82 is an adhesive bond coat 84. As previously mentioned, bond coat 84 is an adhesive coating applied over the wire used to form coil 46 to facilitate the shaping and winding of the actuator coil 46. One example of a bond coat 84 used is a polyamide adhesive resin.

Applied over bond coat 84 is a lubricant layer 86. The lubricant layer 86 is applied to keep the coil wire 78 from sticking to itself prior to the wire 78 being wound into the coil 46. In a preferred embodiment, the lubricant layer 86 is comprised of a high molecular weight hydrocarbon based lubricant. In a preferred embodiment, this lubricant is a low volativity oil, where the volatility range by thermogravemetric analysis (TGA) shows negligible weight loss below 250 degree celsius. The chemical composition is pure saturated branched chain hydrocarbon. With regard to the lubricant's viscosity, the only requirement is that the lubricant be capable of being applied to give a thin film using conventional application means such as oiler pads. One example of a suitable lubricant is polyalphaolefin oil, 176F manufactured by the Nye Lubricant Company in New Bedford, Mass. This lubricant is successfully used on the coil wire because so little of it, if any, comes off from the coil 46 when the coil 46 gets hot in the disk drive 10.

When the disk drive 10 is being operated, current is passed through the actuator coil 46 in order to position the read/write head over the desired position on the surface 28 of the disk 14. As current passes through the coil 46, the coil 46 gets hot. It is known in the art that temperatures in the coil 46 will easily exceed 100 degrees Celsius during operation of high performance drives. As the temperature in the coil 46 increases, due to the high molecular weight of the hydrocarbon based lubricant, the lubricant layer 86 is not volatilized and accordingly does subsequently condense on the surface 28 of the disk 14 where the temperature in the disk drive 10 is substantially cooler.

In an alternative embodiment, the lubricant layer 86 is comprised of a hydrocarbon based lubricant having a very low molecular weight. In this alternative embodiment, the lubricant layer 86 is has a molecular weight equal to or less than 226. This low molecular weight lubricant preferably has a volatility range by thermogravemetric analysis (TGA) of 95 percent weight loss by 130 degrees Celsius. Alternatively, this lubricant may have a volatility range by thermogravemetric analysis of 94 percent weight loss by 145 degrees Celsius. The chemical composition of the lubricant is pure saturated branched chain hydrocarbon. One example of a suitable lubricant for the alternative embodiment is polyalphaolefin oil 167A manufactured by the Nye Lubricant Company in New Bedford, Mass.

In the alternative embodiment during disk drive 10 operation, as with the preferred embodiment, current is passed through the coil 46 in order to position the read/write head 26 over the desired position on the surface 28 of the disk 14. As current passes through the coil 46, the temperature in the coil increases and the coil 46 gets hot. Again, it is a common operating condition for the temperature in the coil 46 to exceed 100 degrees Celsius. However, as the temperature in the coil 46 increases, due to the low molecular weight of the hydrocarbon based lubricant in this embodiment, the lubricant layer 86 has either completely volatilized prior to coil winding or any remaining lubricant now is completely volatilized, completely evaporates, and accordingly does not condense on the surface 28 of the disk 14 where the temperature in the drive 10 is cooler.

FIG. 5b is a cross-sectional view of an alternative embodiment of the coil wire 78 of the present invention. In the embodiment shown in FIG. 5b, there is no adhesive bond coat 84 overlying the insulating layer 82 covering the conductive core 80. Instead, the lubricant layer 86 is applied directly over the insulating layer 82, to prevent friction of the wire 78 in the spooling and despooling operations.

Figure 6:
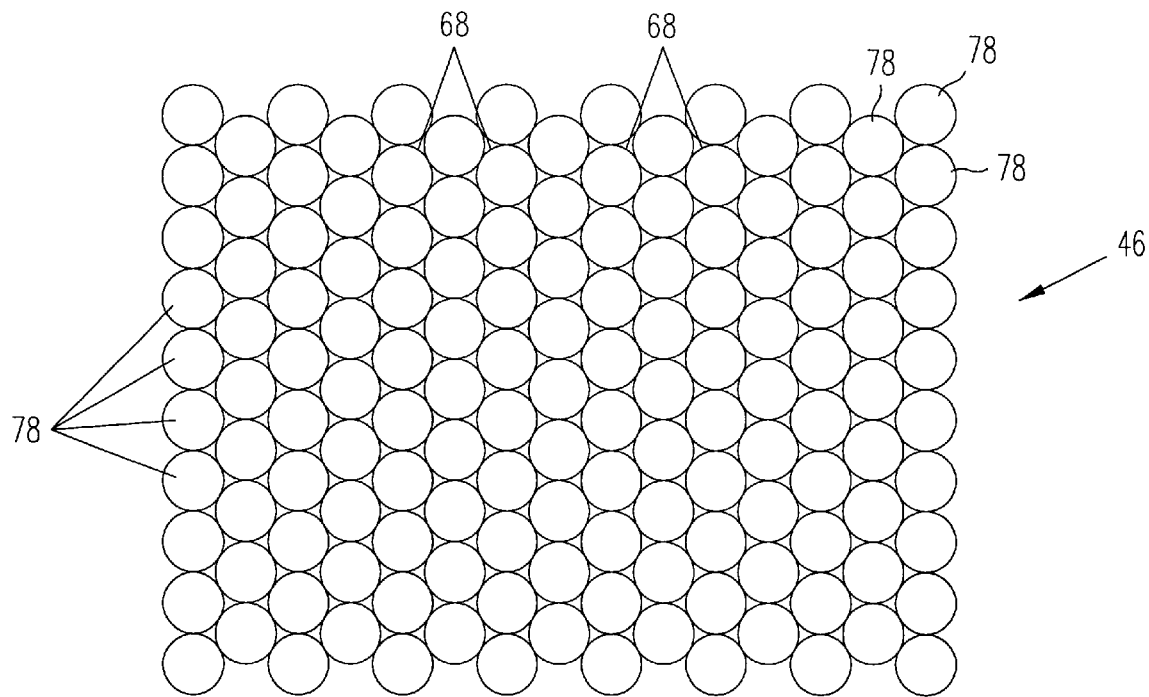
FIG. 6 is a cross-sectional view taken along lines 6—6 of FIG. 3a of the coil winding in accordance with the present invention.

FIG. 6 is a cross-sectional view of an actuator coil 46, taken along lines 6—6 of FIG. 3a. As seen with reference to FIG. 6, the wire 78 is wound many times to form the actuator coil 46. It is understood that the cross section of the spindle motor windings would be quite similar to that shown in FIG. 6. Reference numeral 68 indicates the interspatial spacings between the coil windings where the lubricant 86 is trapped during manufacturing.

Figure 7:
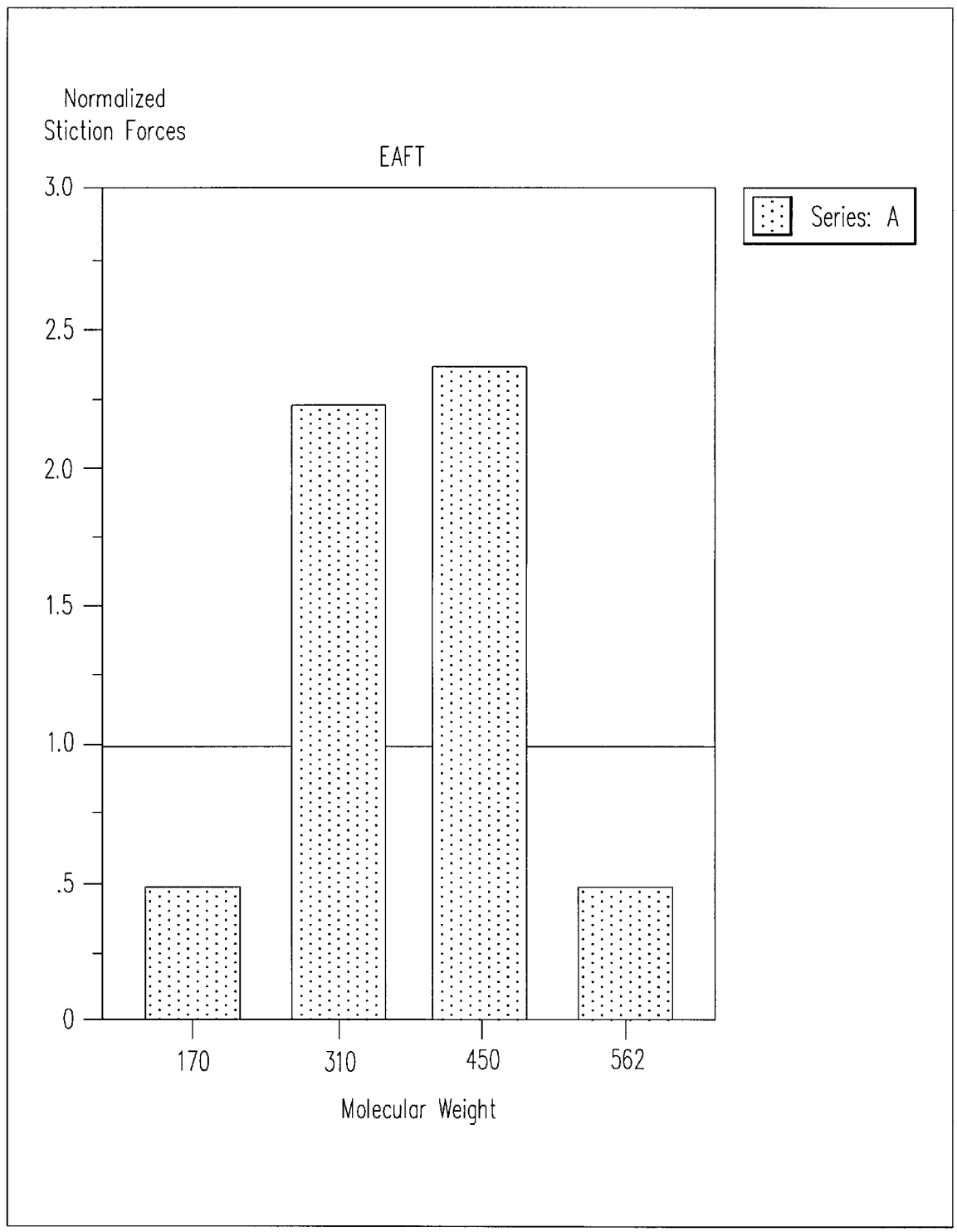
FIG. 7 is a graphical representation of the reduction of stiction problems in disk drives incorporating the present invention.

FIG. 7 illustrates the reduction in stiction problems during disk drive operation as the result of the present invention. The bar chart of FIG. 7 represents the results of environmentally accelerated friction tests (EAFT), as described by R. Koka, Mircocontamination published September/October 1993, pages 41–48, where the x-axis represents the different hydrocarbon molecular weight based lubricants which were tested and the y-axis indicates a normalized measure of the start friction (stiction) forces between a head stack and a disk. The stiction forces were measured in grams per head, and the disks were also inspected for visible haze on the surface upon completion of the tests. On the graph in FIG. 7, a pass fail rate of the lubricants is indicated by the stiction force line at 1.

It can be seen in FIG. 7 that the coils having the lubricants with a molecular weight of 170 or below, and that coils having the lubricants with a molecular weight of 562 and greater experienced a superior reduction in stiction over the lubricants commonly used in the prior art. The stiction forces exhibited by the 310 and 450 based lubricants would cause severe damage to the head/disk interface.

Figure 8:
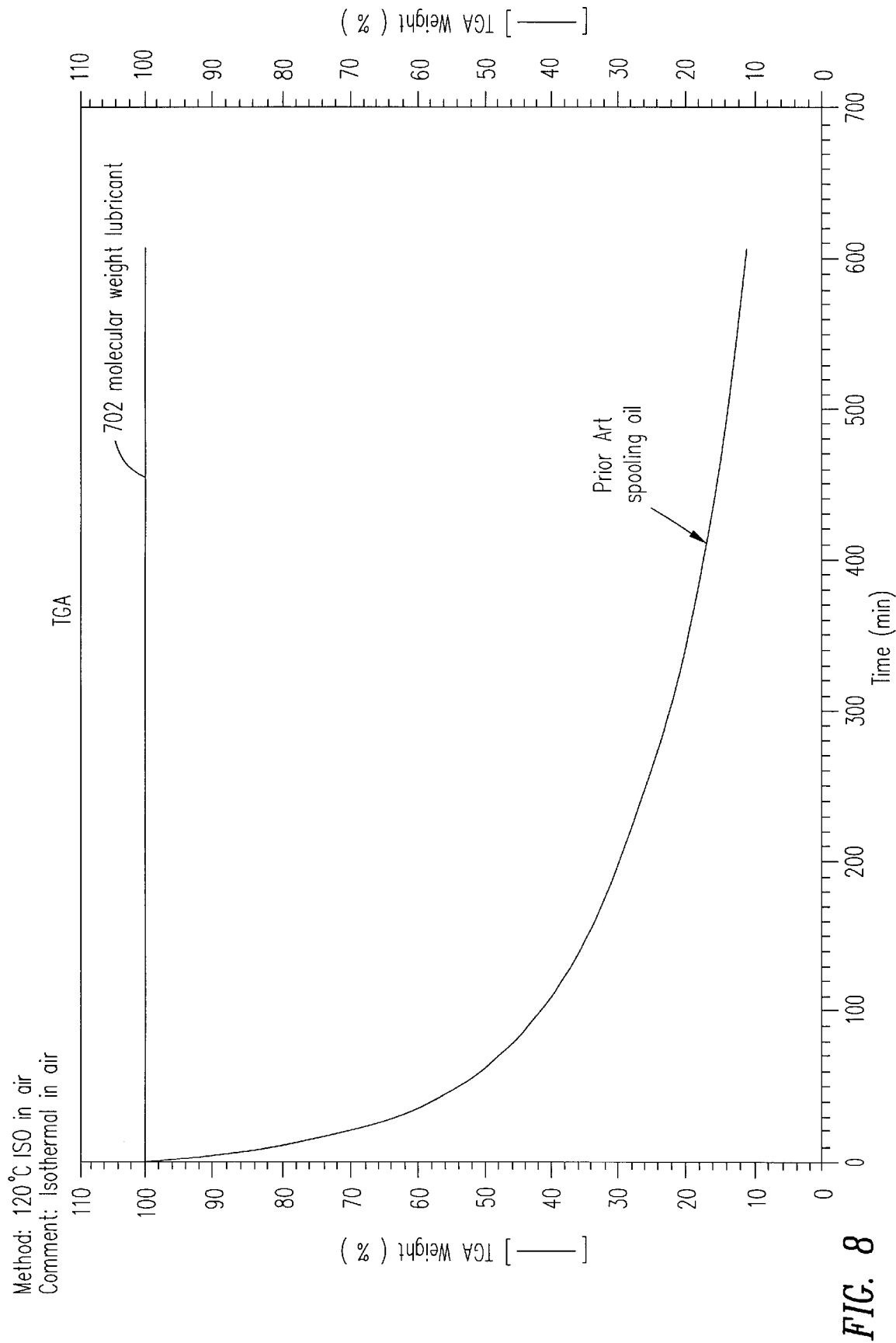
FIG. 8 is a graph showing a thermal gravemetric analysis of a preferred lubricant of the present invention.

FIG. 8 shows the results of thermal gravimetric analysis (TGA) done in connection with the present invention. This technique is a thermal analytical technique that measures the weight loss of a given sample when subjected to heat. In the graph shown, TGA was used to compare the thermal stability of the coil wire lubricants having high molecular weight, in the range of 702 or higher, verses the thermal stability of the prior art spooling oils, having a mixture of molecular weights, ranging from 310 to 450. Here, using an isothermal method, where each of the oils were maintained at 120 degrees Celsius for 10 hours in air, the weight change was measured over time. The results show that the standard oil lost more than 90% of its initial weight over the 10 hour period, while the higher molecular weight lubricant exhibited essentially no weight change.

Figure 9:
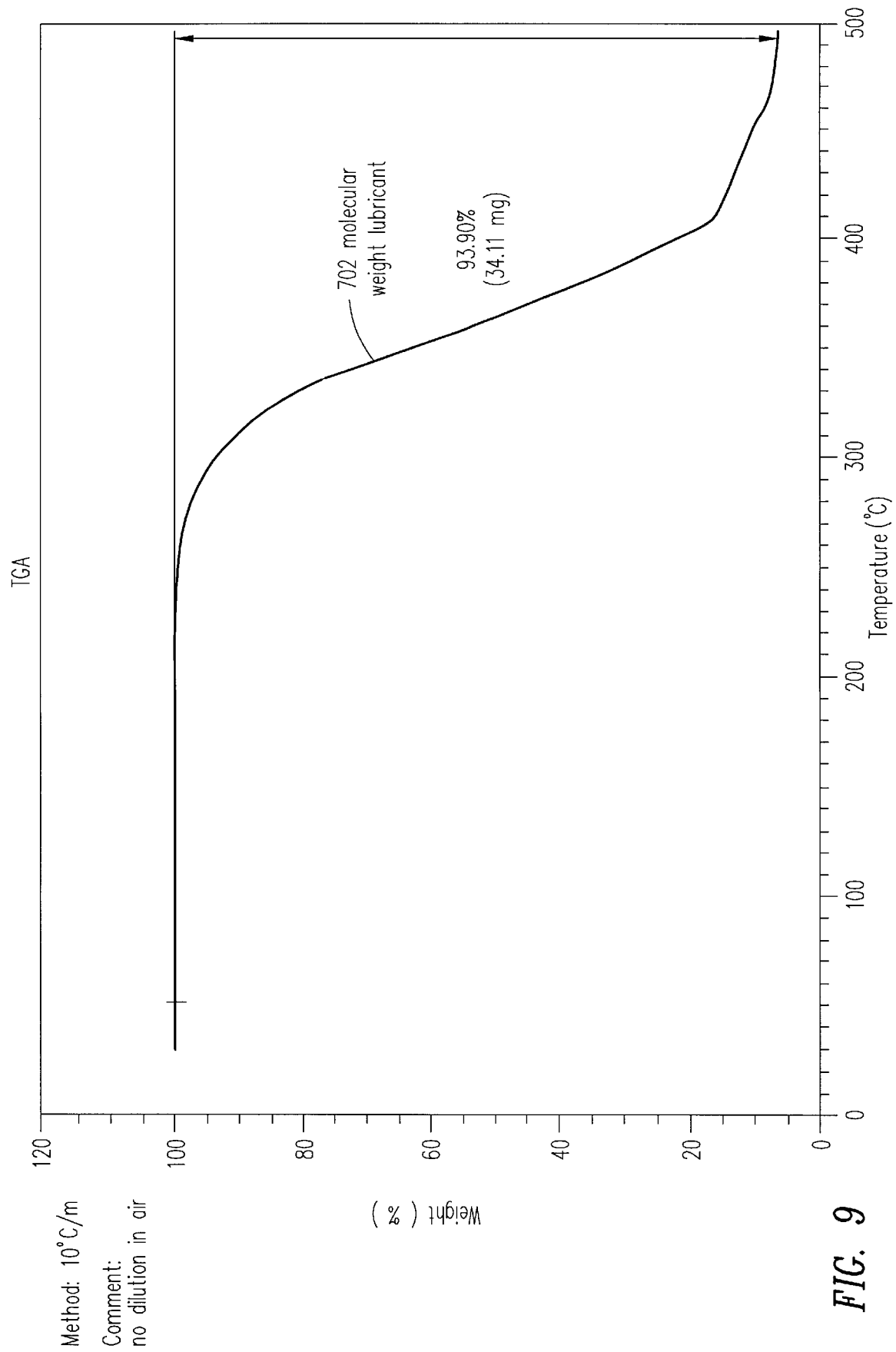
FIG. 9 is a graph showing a second thermal gravemetric analysis of a preferred lubricant of the present invention.

FIG. 9 shows a the results of a second TGA method used to measure the weight loss of the lubricants when subjected to heat. In this method, the temperature was increased from 30 degrees Celsius to 500 degrees Celsius at 10 degrees Celsius per minute in air. The results showed that the weight change of the preferred lubricant did not occur until the temperature reached 230 degrees Celsius, with the maximum rate of change occurring at 340 degrees Celsius. It is understood by those knowledgeable in disk drive technology, that operating a drive with spindle and actuator coils heated to these extreme temperatures would cause numerous problems other than vapor phase transport of disk contaminants.

Figure 10:
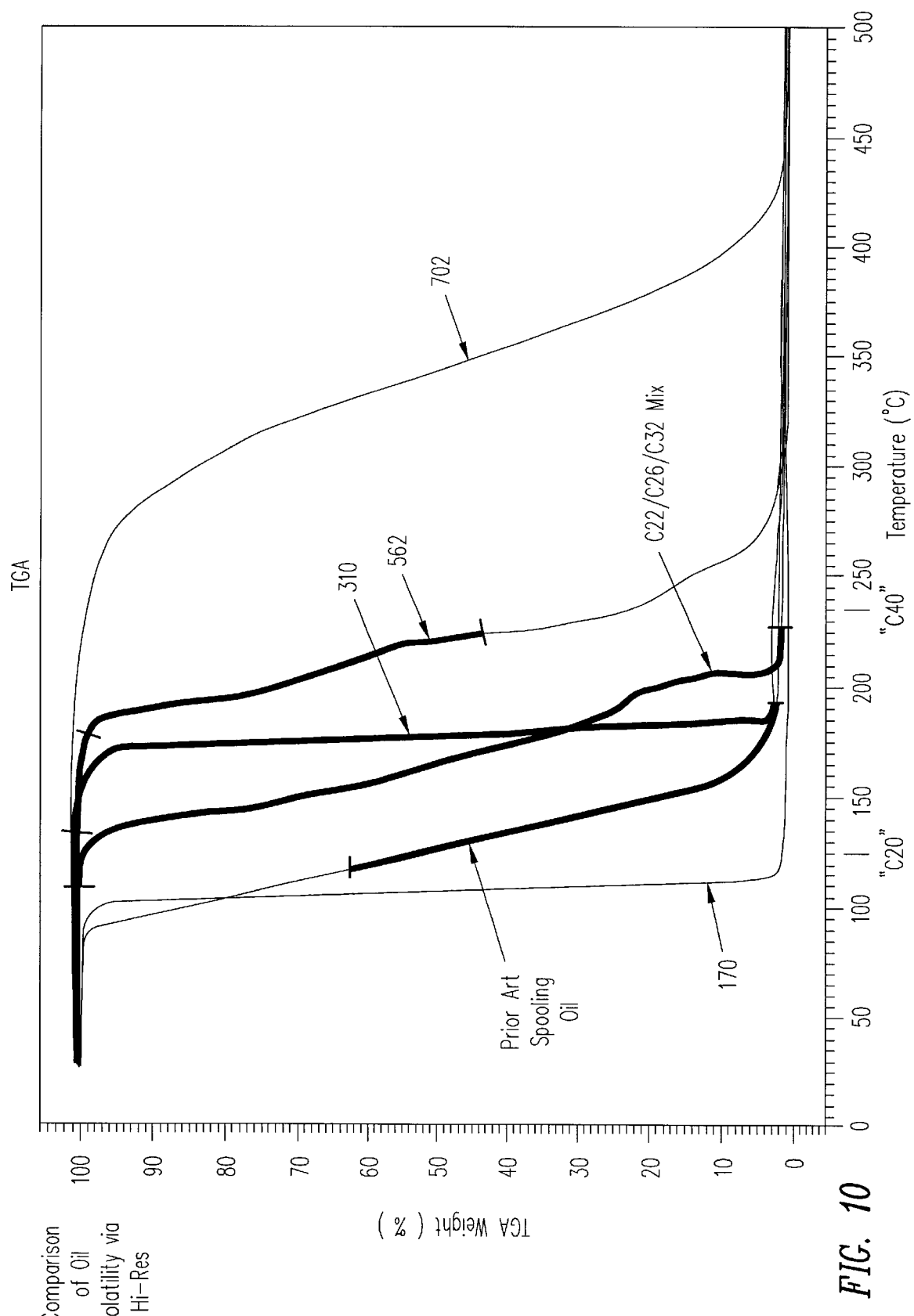
FIG. 10 is a chart comparison of oil volatility of various oils over a range of temperatures.

FIG. 10 is also a graph showing the comparison of lubricant volatility over an increasing temperature range. The period of most rapid weight loss verses temperature for each of the lubricants tested is indicated in the graph by the bold portions of each of the lines. Again, it is seen that the low volatility lubricant experiences negligible weight loss below 250 degrees Celsius, while the high volatility lubricant experiences a 95 percent weight loss before 130 degrees Celsius; both of which are particularly suited in manufacturing actuator coils and stator coils for use in disk drive systems. It can be seen from the graph in FIG. 10 that the preferred lubricants are those that experienced less than or equal to 10% weight loss at 2 to 2½ times the operating temperature of the coil.

While the preferred embodiments of the present invention have been illustrated herein in detail, it should be apparent that modifications and adaptations to those embodiments may occur to those skilled in the art without departing from the scope of the present invention as set forth in the following claims.

We claim:

1. An actuator assembly for a disk drive comprising:
   an actuator having a forward portion for attachment to a suspension assembly, a pivot point and a rearward portion including a pair of rearward legs extending in a direction opposite the forward portion; and
   an actuator coil disposed between the pair of rearward legs of the rearward portion, the actuator coil including an electrical conductor, an insulating layer overlaying the electrical conductor, and a lubricant layer overlying the insulating layer, the lubricant layer being a hydrocarbon based oil that will lose 10 percent of its weight or less at 2 to 2½ times an operating temperature of the coil.

2. The actuator assembly of claim 1, wherein the lubricant layer is a pure saturated branched chain hydrocarbon having a molecular weight equal to or greater than seven hundred.

3. The actuator assembly of claim 1, wherein the lubricant layer is a pure saturated branched chain hydrocarbon having a molecular weight of 492 or greater.

4. The actuator assembly of claim 3, further comprising a bond coat between the insulating layer and the lubricant layer.

5. An actuator assembly for a disk drive comprising:

an actuator having a forward portion for attachment to a suspension assembly, a pivot point and a rearward portion including a pair of rearward legs extending in a direction opposite the forward portion; and an actuator coil disposed between the pair of rearward legs of the rearward portion, the actuator coil including an electrical conductor, an insulating layer overlying the electrical conductor, and a lubricant layer overlying the insulating layer, the lubricant layer being a hydrocarbon based oil having a low molecular weight.

6. The actuator assembly of claim 5, wherein the low molecular weight is in the range of 226 or lower.

7. The actuator assembly of claim 5, wherein the low molecular weight is in the range of 170 or lower.

8. The actuator assembly of claim 7, further comprising a bond coat positioned between the insulating layer and the lubricant layer.

9. An actuator assembly for a disk drive comprising:

an actuator having a forward portion for attachment to a suspension assembly, a pivot point and a rearward portion including a pair of rearward legs extending in a direction opposite the forward portion; and an actuator coil disposed between the pair of rearward legs of the rearward portion, the actuator coil including an electrical conductor, an insulating layer overlying the electrical conductor, and a lubricating layer overlying the insulating layer, the lubricating layer being a hydrocarbon based oil having a high molecular weight.

10. The actuator assembly of claim 9, wherein the hydrocarbon based oil has a molecular weight of 492 or greater.

11. The actuator assembly of claim 9, wherein the hydrocarbon based oil has a molecular weight of 700 or greater.

* * * * *